United States Patent
Kobayashi (10) Patent No.: US 8,723,131 B2
(45) Date of Patent: May 13, 2014

(54) RADIATION IMAGING SYSTEM

(75) Inventor: Kensuke Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 12/750,898

(22) Filed: Mar. 31, 2010

(65) Prior Publication Data

US 2010/0301223 A1 Dec. 2, 2010

(30) Foreign Application Priority Data

Jun. 1, 2009 (JP) ................................. 2009-132431

(51) Int. Cl.
- *H01L 27/146* (2006.01)
- *G01T 1/20* (2006.01)
- *G01T 1/24* (2006.01)
- *H01J 31/49* (2006.01)
- *A61B 6/08* (2006.01)
- *A61B 6/04* (2006.01)

(52) U.S. Cl.
USPC ............ 250/370.09; 250/370.11; 250/370.01; 378/189; 378/204; 378/205; 378/206; 378/207; 378/208; 378/209; 378/210

(58) Field of Classification Search
CPC ........... G01T 1/24; G01T 1/20; G01T 1/2018; A61B 6/4405; A61B 6/4283; A61B 6/0407; A61B 6/547
USPC .......... 250/370.09, 370.11, 370.01; 378/189, 378/204–210
See application file for complete search history.

(56) References Cited

U.S. PATENT DOCUMENTS

| | | | |
|---|---|---|---|
| 5,715,292 A * | 2/1998 | Sayag et al. | 378/98.8 |
| 6,398,409 B1 * | 6/2002 | Brooks | 378/209 |
| 6,592,257 B1 * | 7/2003 | Heidsieck et al. | 378/189 |
| 7,015,478 B2 | 3/2006 | Yamamoto | 250/370.09 |
| 7,016,467 B2 * | 3/2006 | Brooks | 378/102 |
| 7,126,129 B2 | 10/2006 | Yamamoto | 250/370.09 |
| 7,712,959 B2 * | 5/2010 | Tanabe et al. | 378/189 |
| 7,740,405 B2 * | 6/2010 | Ohta et al. | 378/189 |
| 7,989,773 B2 * | 8/2011 | Jadrich et al. | 250/370.09 |
| 2007/0173108 A1 * | 7/2007 | Niwa | 439/497 |
| 2008/0188841 A1 * | 8/2008 | Tomasello et al. | 606/11 |
| 2010/0284521 A1 * | 11/2010 | McBroom et al. | 378/189 |

FOREIGN PATENT DOCUMENTS

| | | | |
|---|---|---|---|
| JP | 06-152212 | 5/1994 | |
| JP | 2000-037374 | 2/2000 | |
| JP | 2000-175906 | 6/2000 | |
| JP | 2003-061942 | 3/2003 | ............... A61B 6/00 |
| JP | 2004-173907 | 6/2004 | ............... A61B 6/00 |
| JP | 2009-066390 | 4/2009 | |
| JP | 2009-080103 | 4/2009 | |

* cited by examiner

*Primary Examiner* — David Porta
*Assistant Examiner* — Mindy Vu
(74) *Attorney, Agent, or Firm* — Fitzpatrick, Cella, Harper & Scinto (57) ABSTRACT

A radiation imaging system includes a portable electronic cassette having a first cable that includes at least one of a signal line and a power line and is provided with a first connector for connecting to another connector, the electronic cassette being configured to acquire an image based on radiation transmitted through an object; a controller having a second cable that includes at least one of a signal line and a power line and is provided with a second connector for connecting to the first connector, the controller being configured to control an imaging operation of the electronic cassette via these cables; and a patient platform having an electronic cassette-housing unit in which the electronic cassette can be installed and a connector holding unit in which the second connector can be fixedly fitted. Here, the first connector has a lock/unlock operation unit configured to detachably connect to the second connector.

24 Claims, 5 Drawing Sheets

RADIATION IMAGING SYSTEM

BACKGROUND OF THE INVENTION

1. Field of the Invention

The present invention relates to a radiation imaging system.

2. Description of the Related Art

Radiation imaging apparatuses are known that capture a radiation image of a subject by irradiating the subject with radiation (for example, X-rays) and detecting the intensity distribution of the radiation that has been transmitted through the subject. Such apparatuses are widely used in the fields of medicine, industry, and the like.

Such imaging generally is performed using a film-screen method for radiation. This method performs imaging through a combination of a photosensitive film and a phosphor having sensitivity to radiation. In this method, a sheet of a rare-earth phosphor that emits light upon irradiation with radiation is held on both faces of a photosensitive film in close contact with them. Radiation that has been transmitted through an object is converted into visible light by means of the phosphor, and the photosensitive film picks up the light. Thereafter, a latent image formed on the film is developed by chemical processing and thus visualized.

On the other hand, with the recent advances in digital technology, a scheme of converting a radiation image into an electrical signal, performing image processing on this electrical signal, and thereafter reproducing the resulting signal on a CRT or the like as a visible image, thus obtaining a high-quality radiation image is becoming widespread. An example of such a method of converting a radiation image into an electrical signal is a technique of temporarily accumulating a radiation transmission image in a phosphor as a latent image, then photoelectrically reading the latent image by irradiating excitation light such as laser light, and outputting the result as a visible image.

Moreover, with the recent advances in semiconductor process technology, apparatuses for capturing a radiation image using a semiconductor sensor are known. This system has a very wide dynamic range as compared with conventional radiation imaging systems that use a photosensitive film, and therefore can provide a radiation image unaffected by variations in the amount of exposure to radiation. Furthermore, unlike the conventional photosensitive film scheme, the need for chemical processing is eliminated, and an output image can be obtained immediately.

X-ray imaging systems will now be described as an example of such radiation imaging systems. Generally, X-ray imaging systems are broadly divided into a stationary type that is installed in a predetermined place, such as an imaging room, and a portable type (a cassette) that can be carried freely. FPDs (flat panel detectors) also have the portable type, which includes an electronic cassette (hereinafter sometimes abbreviated as the cassette), and the race to develop a smaller and lighter electronic cassette is heating up.

In such situation, there is a growing need for the use of a single cassette for a plurality of imaging purposes. For example, when a cassette is used for imaging, generally, imaging is performed with the cassette being placed in an arbitrary position; however, there is a demand for the use of a cassette in a stationary application in which the cassette is installed in a decubitus table or the like. Moreover, this need also includes a demand for an operator himself/herself to be able to perform imaging appropriately according to circumstances without relying on a specially-trained service person.

That is to say, the compatibility of a cassette with various X-ray imaging systems at the operator level is beginning to be regarded as important.

In a process of acquiring and outputting an X-ray image, a conventional cassette supplies power to, for example, a semiconductor sensor and various related modules at all times. For this purpose, the cassette is provided with a cable for transmitting power or control signals and is electrically connected to a controller by this cable. The cable is required to have a certain degree of length in order that the cassette can be carried or moved as desired.

However, such a cable may hinder the handling of the electronic cassette, and furthermore, in the case where there is an excess of length, someone may be caught by the cable and fall, and hence the cable, cassette, or controller may be damaged. In particular, in a space, such as an operating room, where surgical treatment is provided, a clean (sterilized) environment is required, and it is necessary to prevent an imaging system including the cable from touching an open (unsterilized) area such as a floor surface.

Here, as disclosed in Japanese Patent Laid-Open Nos. 2003-061942 and 2004-173907, a technique of providing a detachable connector at a lateral end portion of the cassette or in the midst of the cable is known. With this technique, the weight and size of the cassette can be reduced by minimizing the length of the cable connected to the cassette, and thus the portability and the ease of positioning can be improved.

Furthermore, a technique by which the cable connected to the cassette can be connected to a cable connected to the controller via connectors is also known. In the case of this technique, a lock/unlock means is provided at an end of the controller-side cable.

However, with the above-described technique, when the cassette-side connector and the controller-side connector are to be locked/unlocked, it is necessary for the operator to use both hands to perform the operation. Therefore, the operator, for example, temporarily puts the cassette somewhere, thus leaving both hands free to perform the lock/unlock operation of the connectors. In this case, time is taken to make the cassette portable, and therefore, this technique is unsuitable at a scene of urgency, in particular, an emergency scene or the like.

Moreover, there also is a risk of accidental dropping of the cassette, and in this case, the built-in semiconductor sensor may be damaged, or the imaging system or the operator may touch the open (unsterilized) area.

SUMMARY OF THE INVENTION

The present invention provides a technique by which installation/removal of an electronic cassette with respect to a patient platform can be performed quickly and easily.

According to a first aspect of the present invention there is provided a radiation imaging system comprising: a portable electronic cassette having a first cable that comprises at least one of a signal line and a power line and is provided with a first connector for connecting to another connector, the electronic cassette being configured to acquire an image based on radiation transmitted through an object; a controller having a second cable that comprises at least one of a signal line and a power line and is provided with a second connector for connecting to the first connector, the controller being configured to control an imaging operation of the electronic cassette via the second cable and the first cable; and a patient platform having an electronic cassette-housing unit in which the electronic cassette can be installed and a connector holding unit in which the second connector can be fixedly fitted, wherein the first connector has a lock/unlock operation unit configured to detachably connect to the second connector.

Further features of the present invention will be apparent from the following description of exemplary embodiments with reference to the attached drawings.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

It should be noted that in the following embodiments, a case where X-rays are used as radiation will be described by way of example; however, the radiation is not limited to X-rays, and, for example, electromagnetic waves or α-rays, β-rays, γ-rays, or the like may also be used. Moreover, in the following embodiments, a case where a decubitus table is used as a patient platform will be described by way of example; however, the patient platform is not limited to a decubitus table, and, for example, a standing-position platform, a universal platform, or the like may also be used.

Figure 1:
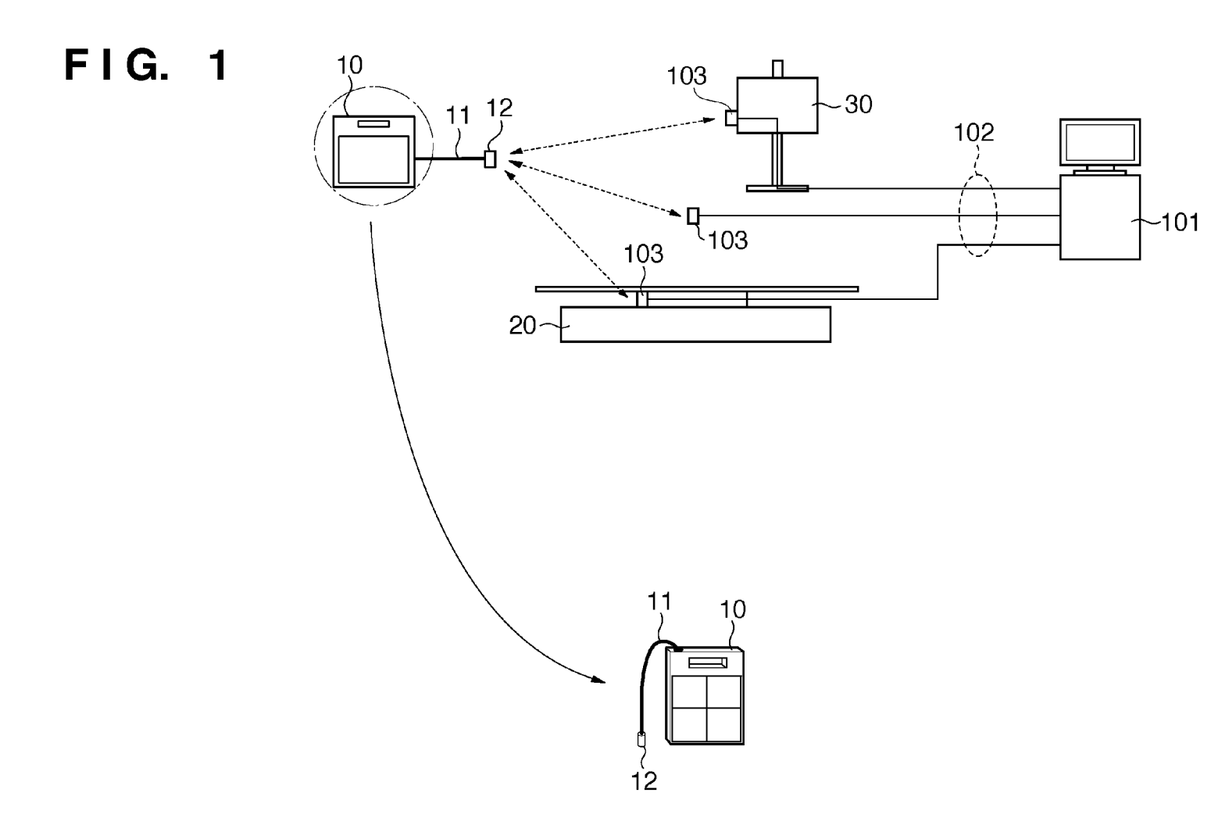
FIG. 1 is a diagram showing an example of a schematic configuration of a radiation imaging system (an X-ray imaging system) according to an embodiment of the present invention.

FIG. 1 is a diagram showing an example of a schematic configuration of a radiation imaging system (hereinafter referred to as an X-ray imaging system) according to an embodiment of the present invention.

An electronic cassette (hereinafter sometimes abbreviated as the cassette) 10 detects X-rays transmitted through an object and acquires an X-ray image based on that object. The electronic cassette 10 can be incorporated into a standing-position platform 30 or a decubitus table 20 in use and can also be used as a separate device in a portable manner. In the case where the electronic cassette 10 is incorporated into the standing-position platform 30 or the decubitus table 20, X-ray imaging is performed in a state in which it is held in a position corresponding to the patient platform.

A controller 101 performs integrated control of processing in the X-ray imaging system. The controller 101, for example, controls an imaging operation performed by the electronic cassette 10 and retrieves a captured image from the electronic cassette 10.

A cassette-side cable 11 (a first cable) and a controller-side cable 102 (a second cable) include a signal line and a power line. It should be noted that the cables may also be cables including at least one of a signal line and a power line. The controller-side cable 102 electrically connects the electronic cassette 10 and the controller 101 in order to realize power feed and communications.

A main body of the electronic cassette 10 is provided with the cassette-side cable 11 having the same functions as the controller-side cable 102, and a cassette-side connector 12 (a first connector) is attached to the end of the cable. The cassette-side connector 12 has a shape to which a controller-side connector 103 (a second connector) provided at the end of the controller-side cable 102 can be removably fitted.

The cassette-side connector 12 is provided with a lock/unlock operation unit 13 configured to detachably lock/unlock the cassette-side connector 12 and the controller-side connector 103. An example of an overview of the cassette-side connector 12 will now be described using FIGS. 2A and 2B. Here, two types of configurations will be described by way of example.

Figure 2A:
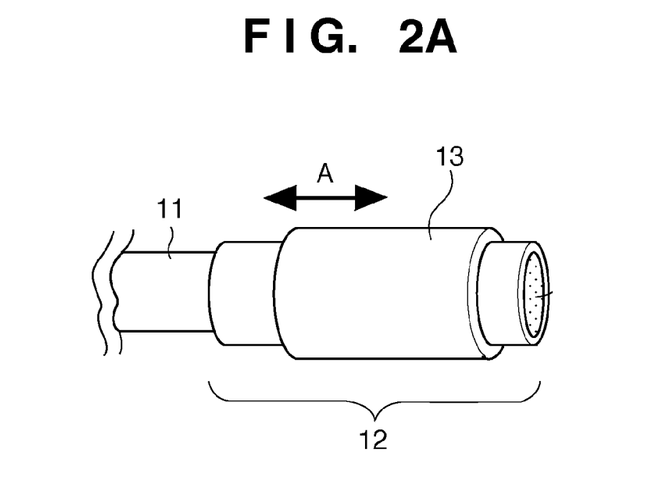
FIGS. 2A and 2B are diagrams showing examples of an overview of a cassette-side connector 12 shown in FIG. 1.

With the cassette-side connector 12 shown in FIG. 2A, when the lock/unlock operation unit 13 is slid in an operating direction A (an axial direction) indicated by the arrow, an engagement portion (not shown) deforms, resulting in a cancellation of the engagement with the controller-side connector 103.

Figure 2B:
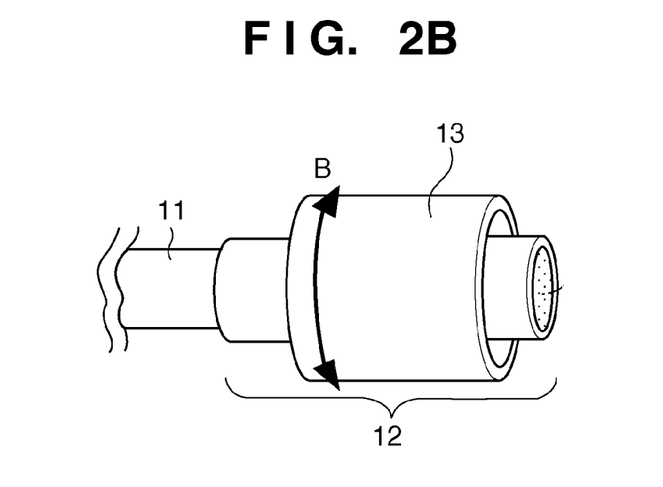

Meanwhile, in the cassette-side connector 12 shown in FIG. 2B, an inner face of the lock/unlock operation unit 13 has a female thread. Here, when the lock/unlock operation unit 13 is rotated in an operating direction B (a circumferential direction) indicated by the arrow, the lock/unlock operation unit 13 is tightened/loosened with respect to a male thread provided on the controller-side connector 103.

It should be noted that the X-ray imaging system shown in FIG. 1 and the cassette-side connector 12 shown in FIGS. 2A and 2B are given for illustrative purposes only, and the present invention is not limited to such configurations. For example, although the cassette 10 shown in FIG. 1 is provided with a handle for gripping the cassette, this configuration is not absolutely necessary. Also, the connecting position of the cassette-side cable 11 is not limited to the position shown in FIG. 1.

Embodiment 1

An X-ray imaging system according to Embodiment 1 will now be described. In Embodiment 1, a case where the electronic cassette 10 is incorporated into the decubitus table 20 in use will be described.

Figure 3:
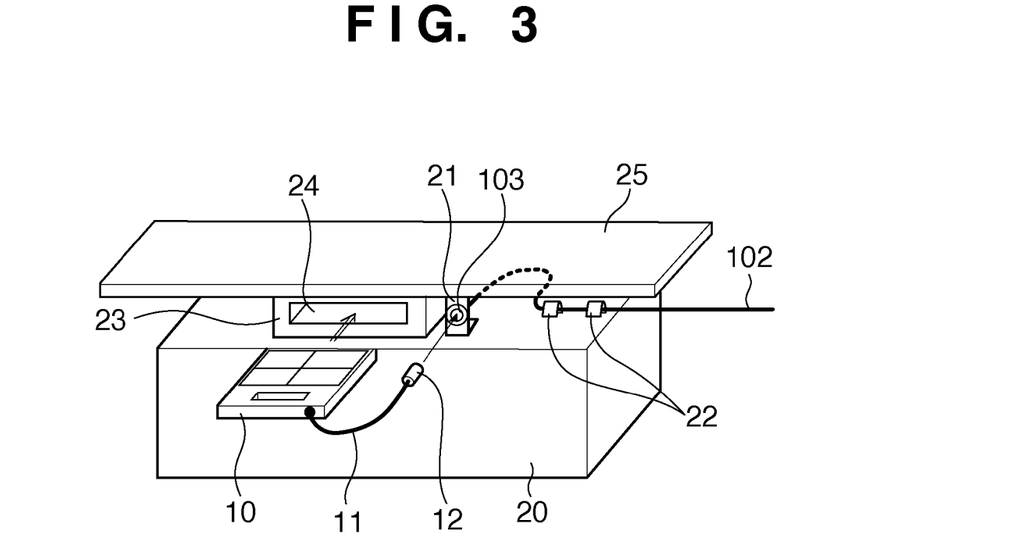
FIG. 3 is a diagram showing an example of an overview of an X-ray imaging system according to Embodiment 1.

FIG. 3 shows an example of an overview in the case where the electronic cassette 10 is incorporated into the decubitus table 20 of the X-ray imaging system shown in FIG. 1.

A holding case 23 that holds and fixes the electronic cassette 10 is provided directly under a top plate 25 of the decubitus table 20. An opening (an electronic cassette-housing unit 24) for putting in and taking out the electronic cassette 10 is formed in a side face of the holding case 23 so as to face the outside. The electronic cassette-housing unit 24 is configured so that the electronic cassette 10 can be installed therein.

A connector holder 21 is a member in which the controller-side connector 103 can be fixedly fitted. The connector holder 21 is provided separately from the holding case 23 and fixedly holds the controller-side connector 103 in the state in which the cassette-side connector 12 can be removably fitted to the connector 103 from the outside. It should be noted that the connector holder 21 is provided within a predetermined range from the electronic cassette-housing unit 24. The purpose of this is to allow an operator to perform the installation/removal of the electronic cassette 10 and the lock/unlock of the connectors at one time using both hands.

Moreover, the controller-side cable 102 is fixed by controller-side cable holders 22 between a point at which the cable 102 from the controller 101 reaches the decubitus table 20 and the connector holder 21. In the case where the controller-side cable 102 is excessively long, an excess length of the cable is stored in the holding case 23. Accordingly, the length of the controller-side cable 102 between the controller 101 and the decubitus table 20 is optimized (neither long nor short and is appropriate).

The controller-side connector 103 is fixed to the decubitus table 20 as described above. Thus, during installation/removal of the electronic cassette 10, the operator can operate the lock/unlock operation unit 13 of the cassette-side connector 12 gripped with one hand while gripping the electronic cassette 10 with the other hand. That is to say, the cassette-side connector 12 can be inserted and locked in the controller-side connector 103 at the same time (or at about the same time) as the electronic cassette 10 is installed in the electronic cassette-housing unit 24. Thus, the electronic cassette 10 can be quickly installed in the decubitus table 20, and accordingly the time required to prepare for X-ray imaging can be shortened.

On the other hand, to remove the electronic cassette 10 from the decubitus table 20, the operator grips and pulls out the electronic cassette 10 with one hand and simultaneously unlocks the cassette-side connector 12 and the controller-side connector 103 by operating the connector 12 with the other hand. The electronic cassette 10 can thus be removed from the decubitus table 20.

As described above, according to Embodiment 1, a member that fixes the controller-side connector 103 in the state in which another connector can be removably fitted to the connector 103 directly from the outside is provided, and the lock/unlock operation unit 13 is also provided on the cassette-side connector 12. As a result, the operator can lock/unlock the cassette-side connector 12 with one hand while gripping the electronic cassette 10 with the other hand. Thus, the electronic cassette 10 can be quickly and easily installed in/removed from the decubitus table 20, and accordingly the time required to prepare for X-ray imaging can be shortened.

It should be noted that in addition to the above-described configuration, the controller-side connector 103 may be provided with a detecting unit configured to detect an unlock operation so that a cassette fixation lock of the holding case 23 can be released upon detection of the unlock operation by the detecting unit. In this case, the cassette 10 main body and the cassette-side connector 12 can be detached at the same time, and therefore, the work efficiency can be further improved.

Embodiment 2

Next, Embodiment 2 will be described. In Embodiment 2, a case where the electronic cassette 10 is removed from the decubitus table 20 and used in a portable manner will be described by way of example.

Figure 4:
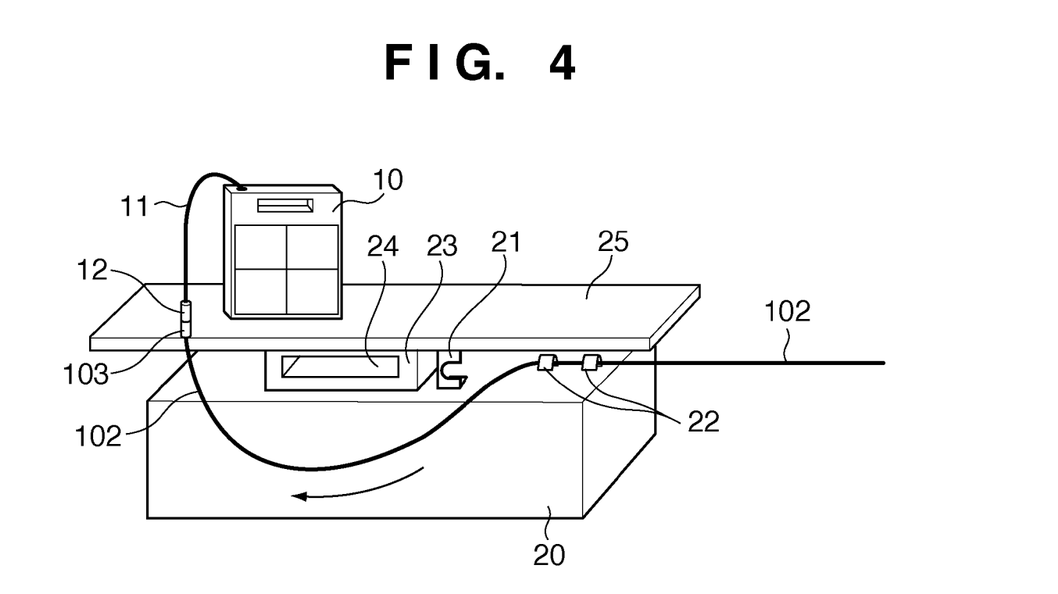
FIG. 4 is a diagram showing an example of an overview of an X-ray imaging system according to Embodiment 2.

Here, in a configuration according to Embodiment 2, as shown in FIG. 4, the controller-side connector 103 is removed from the connector holder 21 and the controller-side cable 102 is drawn out. Thus, the electronic cassette 10 can be freely moved within a range of the length of the cassette-side cable 11 plus the length of the drawn-out controller-side cable 102. That is to say, the area in which X-ray imaging can be performed can be spatially extended around the decubitus table 20 serving as a hub.

Figure 5:
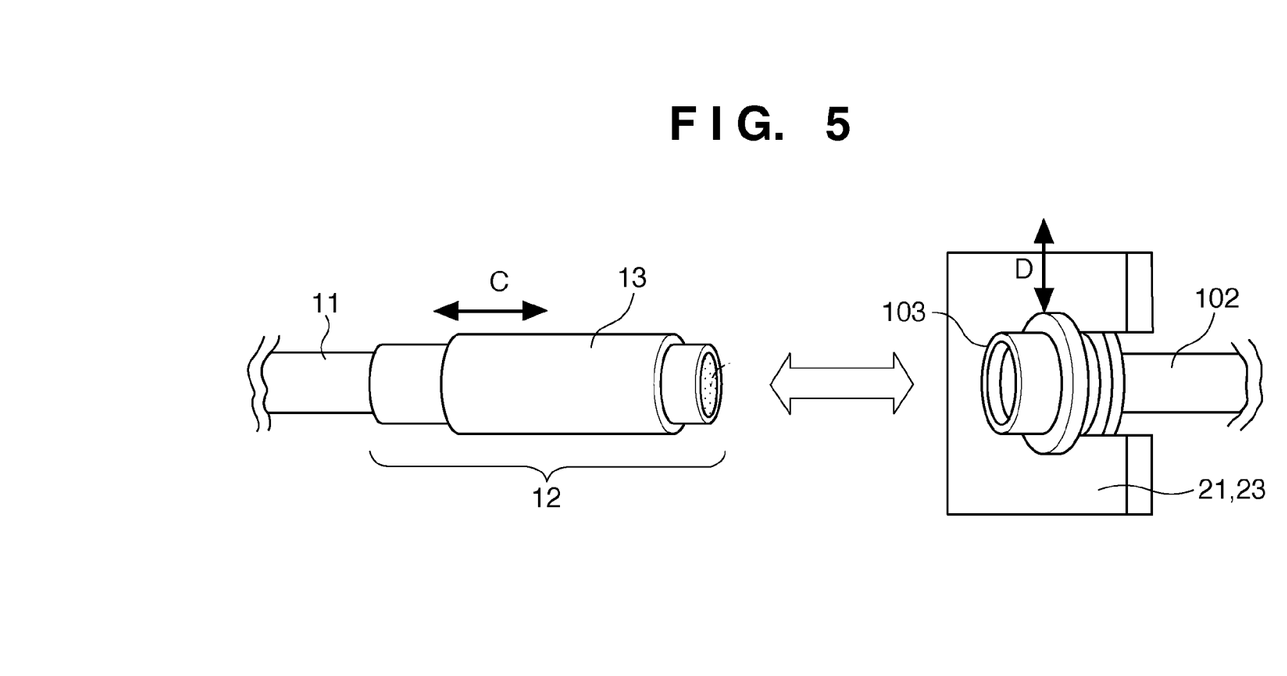
FIG. 5 is a diagram showing an example of an overview of fitting/removal of the cassette-side connector 12, and a controller-side connector 103 and a connector holder 21 according to Embodiment 2.

Now, an example of an operation when fixing or removing the controller-side connector 103 to or from the connector holder 21 will be described. The fixing or removing operation is performed in a direction different from the direction of the lock/unlock operation of the cassette-side connector 12. For example, it is assumed that, as shown in FIG. 5, when the lock/unlock operation unit 13 provided on the cassette-side connector 12 is slid in an operating direction (the axial direction) C indicated by the arrow, an engagement portion (not shown) deforms, resulting in a cancellation of the engagement with the controller-side connector 103. In this case, a configuration is employed in which the controller-side connector 103 is removed from the connector holder 21 when the controller-side connector 103 is operated in an operating direction D perpendicular to the axial direction of the cable.

With this configuration, the operator can fit/remove the controller-side connector 103 using the hand opposite to the hand gripping the electronic cassette 10. Furthermore, during the lock/unlock operation of the cassette-side connector 12, a release of the controller-side connector 103 from the connector holder 21 against the intention of the operator can also be prevented.

As described above, according to Embodiment 2, the area in which X-ray imaging can be performed with the electronic cassette 10 can be spatially extended around the decubitus table 20 serving as a hub. Also, since an excess length of the cable is prevented from touching a floor surface and the like, there is no problem even from a hygienic point of view.

Embodiment 3

Next, Embodiment 3 will be described. In Embodiment 3, both the case where the electronic cassette 10 is incorporated into the decubitus table 20 in use and the case where the electronic cassette 10 is removed from the decubitus table 20 and used in a portable manner will be described by way of example.

Figure 6A:
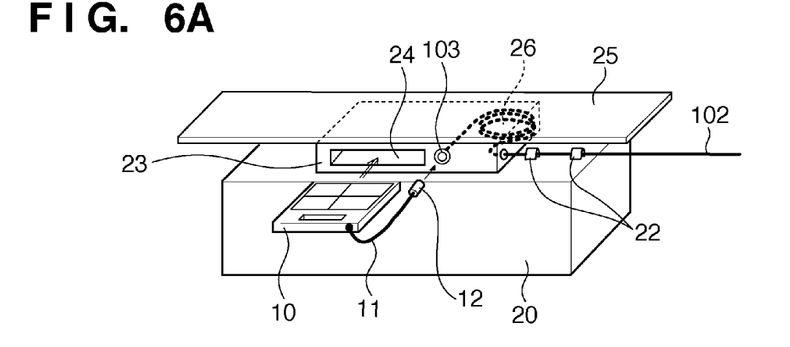
FIGS. 6A to 6C are diagrams showing an example of an overview of an X-ray imaging system according to Embodiment 3.

In a configuration according to Embodiment 3, as shown in FIG. 6A, the electronic cassette-housing unit 24 configured to house the electronic cassette 10 and the connector holder 21 for fixing the controller-side connector 103 are provided on a side face of the holding case 23 that is provided directly under the decubitus table top plate 25. The connector holder 21 fixedly holds the controller-side connector 103 in the state in which the cassette-side connector 12 can be removably fitted to the connector 103 from the outside. Moreover, the connector holder 21 is provided within a predetermined range from the electronic cassette-housing unit 24.

A cable housing unit 26 is provided in the holding case 23. An opening that is in communication with the connector holder 21 is formed in the cable housing unit 26. Thus, in the case where the controller-side cable 102 is excessively long, an excess length of the cable is stored in the cable housing unit 26. Consequently, the length of the controller-side cable 102 between the controller 101 and the decubitus table 20 is optimized (neither long nor short and is appropriate).

Figure 6B:
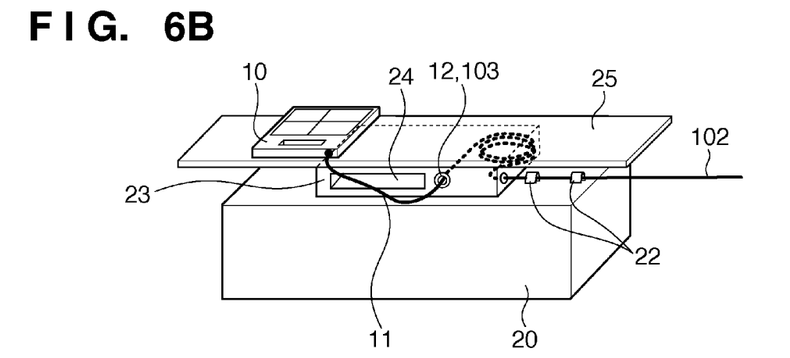

Meanwhile, in the case where the electronic cassette 10 is removed from the decubitus table 20 and used in a portable manner, as shown in FIG. 6B, the electronic cassette 10 is removed from the holding case 23 under the top plate 25. In this case, the electronic cassette 10 can be used placed in an arbitrary position within a range of the length of the cassette-side cable 11.

Figure 6C:
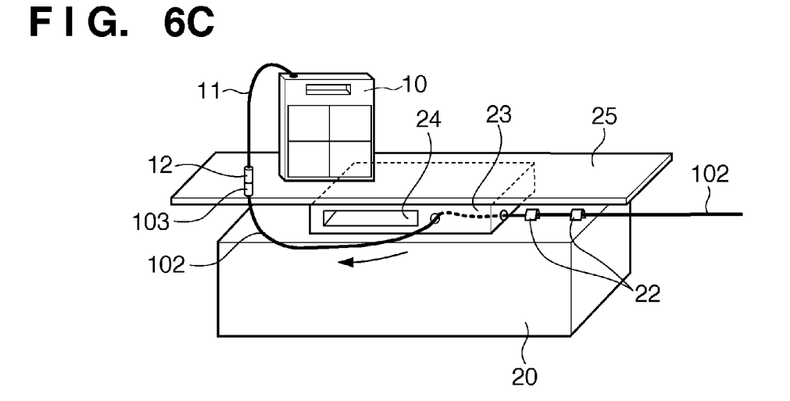

Furthermore, in the case where the head, ankle, or the like is to be imaged laterally using the electronic cassette 10 in, for example, an upright position, it is necessary to move the electronic cassette 10 beyond the range of the length of the cassette-side cable 11. In this case, as shown in FIG. 6C, the operator cancels the fixation of the controller-side connector 103 to the holding case 23 and draws out the controller-side cable 102 from inside the holding case 23. Thus, the electronic cassette 10 can be freely moved within a range of the length of the cassette-side cable 11 plus the length of the drawn-out controller-side cable 102. Therefore, the area in which X-ray imaging can be performed can be spatially extended around the decubitus table 20 serving as a hub.

As described above, according to Embodiment 3, an excess length of the controller-side cable 102 is not exposed to the outside of the decubitus table 20. Accordingly, troubles such as a situation in which the cable gets caught due to a movement of the top plate 25 or an unhygienic situation can be avoided.

The foregoing description gives examples of representative embodiments of the present invention. However, the present invention is not limited to the above-described embodiments shown in the drawings, and modifications can be made as appropriate, as long as the gist of the invention is not altered.

For example, a mechanism for retracting the controller-side cable 102 into the cable housing unit 26 (for example, a take-up mechanism) may be provided. In this case, the drawing out and housing of the cable can be facilitated.

Moreover, in the foregoing description, the radiation imaging system is described using Embodiments 1 to 3. However, part or all of the configurations of Embodiments 1 to 3 may be carried out in combination. For example, the configuration described in Embodiment 2 in which the fitting/releasing directions are different (the fitting/releasing of the cassette-side connector 12 and the controller-side connector 103) can be applied to the configuration of Embodiment 3.

According to the present invention, installation/removal of an electronic cassette with respect to a patient platform can be performed quickly and easily. Thus, for example, the time required to prepare for radiation imaging can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-132431 filed on Jun. 1, 2009, which is hereby incorporated by reference herein in its entirety.

What is claimed is:

1. A patient platform for installing a portable electronic cassette having a first cable that comprises a signal line and is provided with a first connector for connecting to another connector, the electronic cassette being configured to acquire a two-dimensional image based on radiation transmitted through an object, the patient platform comprising:
   structure defining a surface to support a patient;
   a second cable that is provided with a second connector for detachably and electrically connecting to the first connector and sends a signal from a control unit to the electronic cassette via the electrically connected first cable;
   an electronic cassette-housing unit configured to house the electronic cassette removably, and having an opening through which the electronic cassette can be placed in and removed from said electronic cassette-housing unit; and
   a connector holding unit configured to fixedly hold said second connector in a state where the first connector can be removably connected to said second connector from outside,
   wherein said second connector is detachable to said connector holding unit.

2. The patient platform according to claim 1, wherein said electronic cassette-housing unit has said opening for putting in and taking out the electronic cassette facing outside, and
   said connector holding unit is provided within a predetermined distance from said opening.

3. The patient platform according to claim 1, further comprising a cable housing unit configured to house at least a part of said second cable from the controller to said connector holding unit, and
   wherein said cable housing unit is provided with an opening that is in communication with said connector holding unit.

4. The radiation imaging system according to claim 1, wherein said connector holding unit is held at the same height as said opening of said electronic cassette housing unit.

5. The radiation imaging system according to claim 1, wherein said first connector has a lock/unlock operation unit configured to detachably connect to said second connector,
   wherein, in a case where said lock/unlock operation unit is connected to said second connector, said lock/unlock operation unit cancels the connection with said second connector upon being operated in a predetermined direction, and
   said connector holding unit cancels the fixation of said second connector upon being operated in a direction different from the predetermined direction.

6. A radiation imaging system comprising:
   a portable electronic cassette having a first cable that comprises at least one of a signal line and a power line and is provided with a first connector for connecting to another connector, said electronic cassette being configured to acquire an image based on radiation transmitted through an object;
   a controller having a second cable that comprises at least one of a signal line and a power line and is provided with a second connector for connecting to said first connector, said controller being configured to control an imaging operation of said electronic cassette via said second cable and said first cable; and
   a patient platform having an electronic cassette-housing unit in which said electronic cassette can be installed and a connector holding unit in which said second connector can be fixedly fitted,
   wherein said first connector has a lock/unlock operation unit configured to detachably connect to said second connector,
   wherein, in a case where said lock/unlock operation unit is connected to said second connector, said lock/unlock operation unit cancels the connection with said second connector upon being operated in a predetermined direction, and
   wherein said connector holding unit cancels the fixation of said second connector upon being operated in a direction different from the predetermined direction.

7. A radiation imaging system comprising:
   a portable electronic cassette having a first cable that comprises at least one of a signal line and a power line and is provided with a first connector for connecting to another connector, said electronic cassette being configured to acquire an image based on radiation transmitted through an object;

a controller having a second cable that comprises at least one of a signal line and a power line and is provided with a second connector for connecting to said first connector, said controller being configured to control an imaging operation of said electronic cassette via said second cable and said first cable; and a patient platform having a surface for supporting a patient, and having an electronic cassette-housing unit in which said electronic cassette can be installed in a state where said electronic cassette is fixed for an apparatus which generates the radiation and a connector holding unit in which said second connector can be fixedly fitted, wherein said connector holding unit is configured to hold said second connector fixedly in a state in which said first connector can be removably fitted to said second connector from outside and is provided within a predetermined distance from an opening of said electronic cassette housing unit, and wherein said second connector is detachable to said connector holding unit.

8. The radiation imaging system according to claim 7, wherein said connector holding unit is held at the same height as said opening of said electronic cassette housing unit.

9. The radiation imaging system according to claim 7, wherein said first connector has a lock/unlock operation unit configured to detachably connect to said second connector, wherein, in a case where said lock/unlock operation unit is connected to said second connector, said lock/unlock operation unit cancels the connection with said second connector upon being operated in a predetermined direction, and wherein said connector holding unit cancels the fixation of said second connector upon being operated in a direction different from the predetermined direction.

10. An electronic cassette electrically connectable to a patient platform having a connector holding unit in which a platform connector can be fixedly fitted, the electronic cassette comprising:

a first cable that comprises a signal line and is provided with a first connector for connecting to the platform connector, wherein said first connector has a lock/unlock operation unit configured to detachably connect to the platform connector, wherein said lock/unlock operation unit cancels the connection between the platform connector and said first connector upon being operated in a different direction from a direction for canceling the platform connector from the connector holding unit.

11. A holding apparatus for radiation imaging of an object with an electronic cassette for obtaining a radiation image, the electronic cassette including a first connector, the apparatus comprising:

a housing unit including a first aperture via which the electronic cassette is inserted and a second aperture, said housing unit being configured to house the inserted electronic cassette;

a second connector configured to be fixed to said housing unit and to be detachable from the first connector; and a cable having a leading end to which said second connector is attached and which is configured to effect electrical connection, via said second aperture, with an external control apparatus and the housed electronic cassette, wherein said second connector is detachably fixed to said apparatus.

12. The holding apparatus according to claim 11, wherein said cable is fixed to said apparatus at one or more positions.

13. The holding apparatus according to claim 11, wherein the electronic cassette comprises a second cable which extends from the electronic cassette, and wherein said leading end of said first connector is attached to a leading end of the second cable of the electronic cassette.

14. The holding apparatus according to claim 11, further comprising:

a lock mechanism configured to lock an apparatus of the first connector and said second connector; and an operation unit configured to unlock a locking by said lock mechanism, wherein said lock mechanism is unlocked according to a first operation and the apparatus of the first connector and said second connector is unlocked by a second operation.

15. The holding apparatus according to claim 11, wherein said apparatus further comprises the electronic cassette, and wherein said electronic cassette further comprises a handle by which said electronic cassette can be held.

16. The holding apparatus according to claim 15, wherein said second cable extends from an outer surface of said handle.

17. The holding apparatus according to claim 11, wherein said second connector is detachable from said apparatus by applying a force in a direction different from a direction of a force applied to said second connector when the first connector and said second connector are detached from each other.

18. The holding apparatus according to claim 11, further comprising a top plate which is arranged along said housing unit and on which the object is placed.

19. A radiation imaging system comprising:

said apparatus, said electronic cassette and said external control apparatus according to claim 11.

20. A radiation imaging system comprising a plurality of apparatuses according to claim 11, wherein each of said plurality of apparatuses has said cable connected to the external control apparatus.

21. The radiation imaging system according to claim 20, wherein one of said plurality of apparatuses comprises a decubitus table.

22. The radiation imaging system according to claim 20, wherein one of said plurality of apparatuses comprises standing-position platform.

23. A holding apparatus for radiation imaging an object comprising:

a housing unit configured to house an electronic cassette for obtaining a radiation image;

a second connector configured to be detachable from a first connector of the electronic cassette; and a cable which is configured to effect electrical connection, via an internal part of said housing unit, with an external control apparatus and the electronic cassette which is housed in said housing unit, wherein said second connector is detachably fixed to said apparatus.

24. A holding apparatus for radiation imaging of an object with an electronic cassette for obtaining a radiation image, the electronic cassette including a first connector, and the apparatus comprising:

a housing unit including a first aperture via which the electronic cassette is inserted and a second aperture, said housing unit being configured to house the inserted electronic cassette;

a second connector configured to be fixed to said housing unit and to be detachable from the first connector; and a cable having a leading end to which said second connector is attached and which is configured to effect electrical connection, via said second aperture, with an external control apparatus and the housed electronic cassette;

a lock mechanism configured to lock an apparatus of the first connector and said second connector; and an operation unit configured to unlock a locking by said lock mechanism, wherein said lock mechanism is unlocked according to a first operation and the apparatus of the first connector and said second connector is unlocked by a second operation.

\* \* \* \* \*